June 26, 1928.

W. B. BOGGS ET AL

BELT CLAMP

Filed Sept. 6, 1927

Inventors
W. B. Boggs,
A. F. Davis.
By Church & Church
his Attorneys

June 26, 1928.
W. B. BOGGS ET AL
BELT CLAMP
Filed Sept. 6, 1927
1,674,944
2 Sheets-Sheet 2
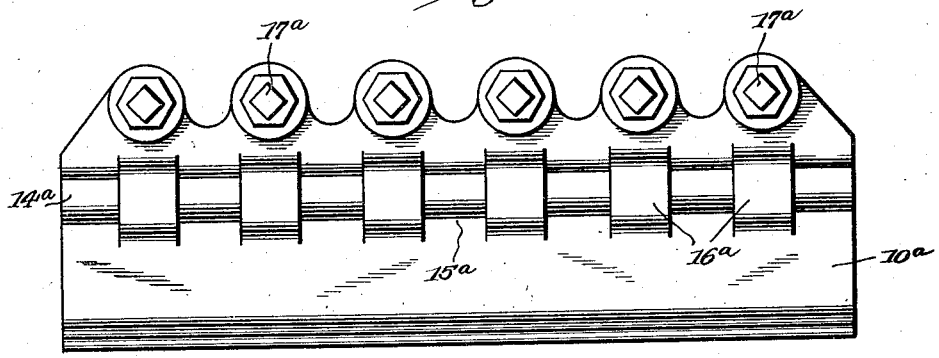
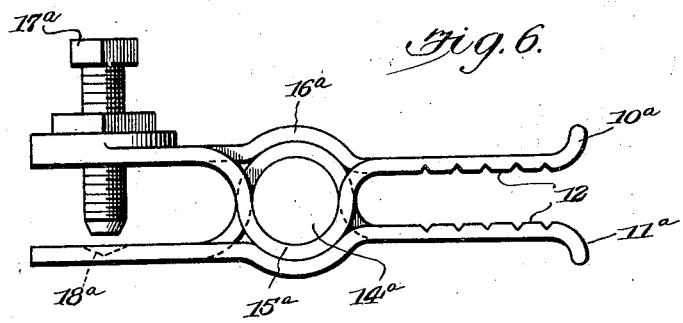
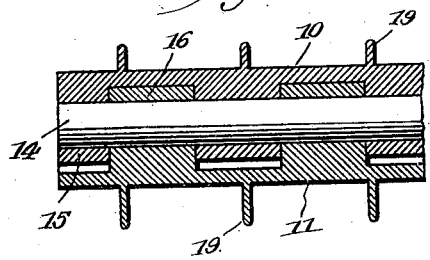
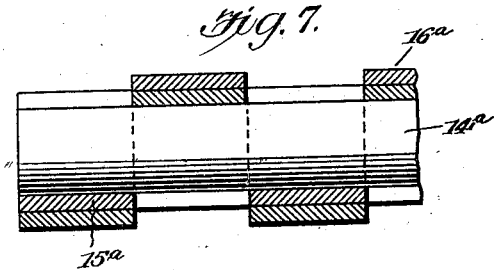
Inventor
W. B. Boggs,
A. F. Davis.
By Church & Church
his Attorneys Patented June 26, 1928.

1,674,944

UNITED STATES PATENT OFFICE.

WILLIAM BENTON BOGGS AND ARTHUR FLEET DAVIS, OF SHREVEPORT, LOUISIANA, ASSIGNORS TO PELICAN WELL TOOL & SUPPLY COMPANY, OF SHREVEPORT, LOUISIANA, A CORPORATION OF LOUISIANA.

BELT CLAMP.

Application filed September 6, 1927. Serial No. 217,826.

This invention relates to improvements in clamps for connecting the ends of a drive belt or the like.

An object of the invention is to provide a clamp with which rather excessive pressures may easily be exerted upon the belt ends by the clamp so as to insure such ends being securely held in said clamp. More specifically, the clamp contemplated comprises two members, each provided with a gripping surface, said members being so associated with one another that the gripping surfaces may be adjusted toward and from each other by a lever action.

A further object is to provide a clamp wherein the belt ends may be securely fastened without the use of fastening elements extending through the belt material.

Another object of the invention is to produce a belt clamp capable of being manufactured at comparatively low cost, due to the simplicity of construction and reduction of parts to a minimum.

With these and other objects in view, the invention consists in certain novel details of construction and combinations and arrangements of parts all as will hereinafter be more fully described and the novel features thereof particularly pointed out in the appended claims.

In the accompanying drawings:—

Fig. 4 is a longitudinal section through a portion of the clamp;

Fig. 5 is a plan view of a modified form of clamp;

Fig. 6 is an end view of said modification, and

Fig. 7 is a longitudinal section through a portion of said modification.

Figure 1:
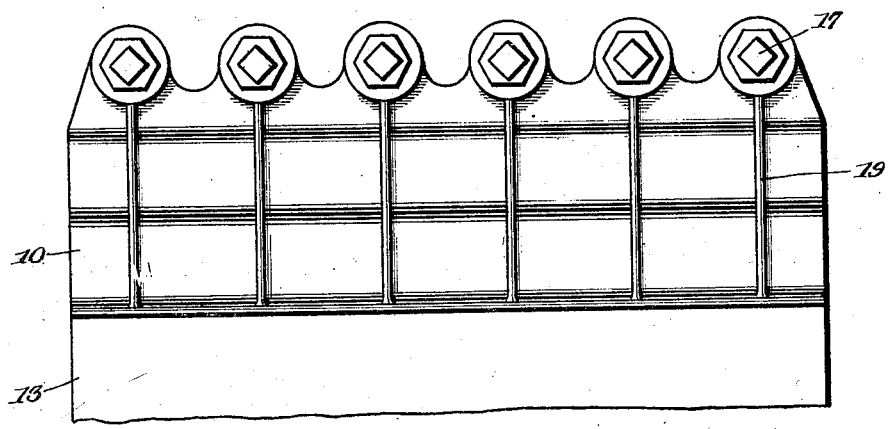
Figure 1 is a plan view of a clamp embodying the present invention.
Figure 2:
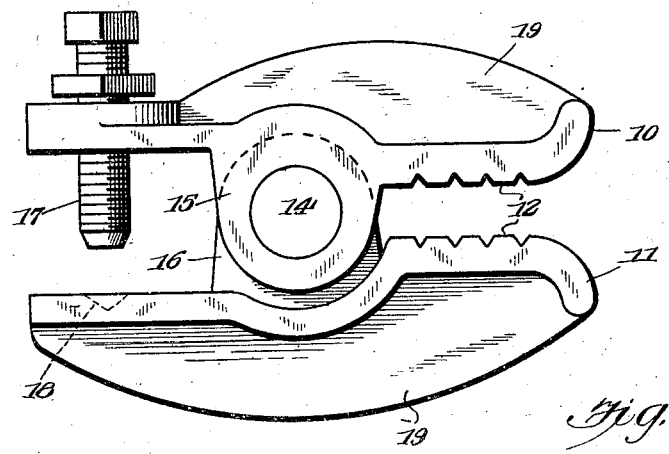
Fig. 2 is an end view with the clamp open.
Figure 3:
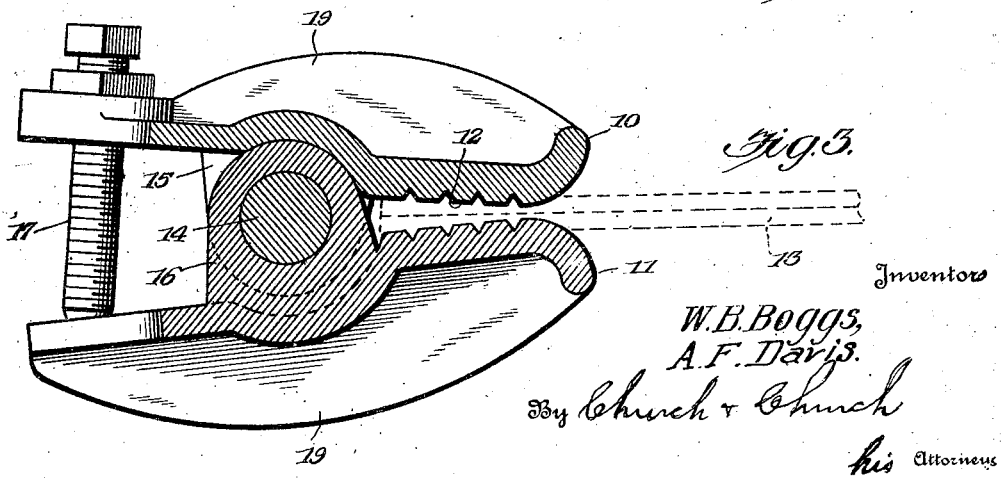
Fig. 3 is a transverse sectional view with the clamp closed on the belt ends.

In the present clamp there are two clamp members, 10, 11, provided with clamping surfaces 12 between which the two belt ends 13 are adapted to be secured. These two clamping members 10, 11 are connected together so that their clamping surfaces may be brought together with a lever action. More specifically, said members are pivotally connected together by a pivot pin 14 extending longitudinally of said members through holes in eyes 15, 16 formed thereon.

As will be apparent, pin 14 can be located at various points transversely of members 10, 11, depending upon the type of leverage it is desired to utilize in clamping the belt ends between surfaces 12. Preferably, however, said pin is located approximately centrally of said members. At the edge of said members, on the side opposite the gripping surfaces 12, means are provided for forcing said surfaces together. For instance, screw bolts 17, threaded through member 10, are adapted to engage member 11, said bolts having conically shaped ends which engage in conical depressions 18 in member 11 for centering said bolts with respect to the threaded apertures in plate 10. This prevents slippage of the bolt ends on member 11.

With this arrangement, the pin 14 lies between the bolts 17 and gripping surfaces 12 so that said pin and the ears 15, 16 act as a stop for limiting the insertion of the belts ends 13 between the members, thereby preventing them being placed so far in between said members as to be engaged by bolts 17. By screwing bolts into member 10 it will be seen that the gripping surfaces 12 will be forced together, it being an easy matter to place the belt ends under any desired pressure to securely grip them. If the bolts 17 are positioned between pin 14 and the gripping surfaces 12, they would have to extend through both members 10, 11 and their action would be different in that they would have to be turned to draw the gripping edges of the members toward one another when the belt ends were inserted in the clamp.

In order that the members 10, 11 may be made comparatively light, they are formed with reinforcing ribs 19 extending transversely thereof. For comparatively narrow pulleys, only one set of clamping members could probably be used, but where it is desired to compensate for any curvature in the crown of the pulleys, each member could be made of a series of articulated sections, the connections between the several sections taking any desired form. The gripping surfaces may be corrugated or ribbed, as shown, although this is not essential. The edges of members 10, 11 adjacent said gripping surfaces may also be somewhat flared, as shown, as this not only facilitates the insertion of the belt ends in the clamp but the possibility of the edges of said members injuring the belt as it passes over the pulley is also reduced by the curvature of the flared edge portions.

In the modified form of clamp shown in Figs. 5 to 7, the members 10ª, 11ª are formed from suitable material by the process of stamping. In this form, strips of the material in the central portions of the sections are stamped or bent out, alternate strips being bent in one direction and the other set of alternate strips in the opposite direction. This produces a longitudinally extending series of offset hollow arcuate lugs or ears 15ª, 16ª on each side of the members which can be alined with each other and a rod or bolt 14ª threaded through the same from end to end to serve as a pivot pin for pivotally connecting the members together. By the provision of the threaded bolts 17ª engaging in the depressions 18ª in member 11ª the gripping surfaces 12ª of the two members may be moved toward and from each other as in the previously described clamp.

What is claimed is:

1. A belt clamp comprising two pivotally connected clamping members having gripping surfaces between which the ends of a belt are adapted to be clamped, and means for forcing said gripping surfaces toward each other to grip said belt ends, the pivotal connection between said members forming a stop to prevent contact of the belt ends with the last mentioned means.

2. A belt clamp comprising two pivotally connected clamping members having gripping surfaces between which the ends of a belt are adapted to be clamped and means located beyond the edges of said belt ends for forcing said gripping surfaces together the pivotal connection between said clamping members limiting the insertion of the belt ends and preventing their contact with the last mentioned means.

3. A belt clamp comprising two pivotally connected clamping members having gripping surfaces at one edge between which the ends of a belt are adapted to be clamped, and bolts carried at the opposite edge of one of said members and engaging the other member for forcing said gripping surfaces together, the pivotal connection between said clamping members forming a stop to limit the insertion of the belt ends and to prevent contact of the same with said bolts.

4. A belt clamp comprising two pivotally connected clamping members having gripping surfaces between which the ends of a belt are adapted to be clamped, and bolts carried by one of said members and engaging the other member for forcing said gripping surfaces together, said bolts being located beyond the edges of said belt ends, the pivotal connection between said clamping members forming a stop to limit the insertion of the belt ends and to prevent contact of the same with said bolts.

5. A belt clamp comprising a pair of clamping members each having a gripping surface adjacent one edge thereof, a pivotal connection between said members, and means adjacent the opposite edges of said members for turning said members on their pivotal connection to force said gripping surfaces toward each other, said pivotal connection forming a stop for limiting the insertion of the belt ends between said members.

6. A belt clamp comprising a pair of clamping means, each formed with an outwardly flared edge, and provided with a gripping surface adjacent said edge, a pivot member connecting said members, and bolts engaging both of said members for turning the same on their pivot to force said gripping surfaces together.

7. A belt clamp comprising two clamping members, a pin pivotally connecting said members, a gripping surface on each member at one side of said pin, and a series of bolts threaded through the opposite edge of one of said members and engaging the other member for forcing the gripping surfaces of the two members together, said pin constituting a stop for limiting the insertion of belt ends between said members.

8. A belt clamp comprising two clamping members, a pin pivotally connecting said members, a gripping surface on each member at one side of said pin, and a series of bolts threaded through the opposite edge of one of said members and engaging the other member for forcing the gripping surfaces of the two members together, said other member having a series of depressions therein for reception of the ends of said bolts.

WILLIAM BENTON BOGGS.
ARTHUR FLEET DAVIS.